United States Patent Office 2,831,026
Patented Apr. 15, 1958

2,831,026

PROCESS FOR GRANULATING DIBENZOYL RESORCINOL

George K. Greminger, Jr., and Richard E. Cook, Midland, and Clarence P. Stieve, Auburn, Mich., assignors to The Dow Chemical Company, Midland, Mich., a corporation of Delaware No Drawing. Application June 4, 1956
Serial No. 588,980

8 Claims. (Cl. 260—591)

This invention relates to a process for converting a resinous mass of ungranulated dibenzoyl resorcinol or related compounds into a granular form. More particularly it relates to such a process employing certain granulating agents for converting dibenzoyl resorcinol into a granular form which is substantially free of contaminants.

Dibenzoyl resorcinol and related substituted dibenzoyl resorcinols have been disclosed as excellent light stabilizers for haloethylene polymers in the copending application of C. B. Havens, U. S. Serial No. 499,757, filed April 6, 1955. However, dibenzoyl resorcinol and those related compounds normally occur as a sticky, resinous, transparent melt. That sticky melt is difficult to incorporate into a polymer formulation in the critical amounts necessary to obtain uniform light stabilization from batch to batch. It is also incapable of comminution by the normal grinding and crushing operations. The unavailability of dibenzoyl resorcinol in a form in which it could be easily blended with polymers and other solid materials has seriously limited its utility in polymer formulations. It would be desirable to have a granular form of dibenzoyl resorcinol which could be easily handled, weighed, and blended with polymers.

It is accordingly the principal object of this invention to provide a process for granulating dibenzoyl resorcinol and related compounds.

It is a further object to provide such a process whereby the dibenzoyl resorcinol is in a granular form which is substantially free of contaminants.

The above and related objects are accomplished by means of a process whereby molten dibenzoyl resorcinol is dispersed with agitation in a heated aqueous solution consisting of from 0.05 to 0.6 percent by weight of the dibenzoyl resorcinol of a water-soluble, alkyl hydroxyalkyl cellulose ether, after which the dibenzoyl resorcinol is allowed to age in dispersed form until crystallization is complete, and is then isolated by decantation, purified by water washing, and dewatered by centrifuging. The resultant product is a granular powder, capable of easy handling and packaging and of blending easily with polymer powders.

For purposes of this application, dibenzoyl resorcinol may be taken to include dibenzoyl resorcinols wherein the benzoyl groups contain substituent alkyl groups, halogens, and the like. The compounds are easily prepared by a number of known methods. In a typical method resorcinol, benzoyl chloride, or an alkyl or halobenzoyl chloride, and a slight excess of aluminum chloride are caused to react in orthodichlorobenzene solution at a temperature of about 135° C. The reaction mixture is acidified and the product purified by distillation and recrystallization. When produced by that process the product is found to consist of a mixture of the 2,4- and 4,6-dibenzoyl resorcinol isomers. Such mixtures are included within the scope of this invention.

The water-soluble alkyl hydroxyalkyl cellulose ethers which are useful in this process are those having gelation temperatures in aqueous solution of about 90° C. or higher. A process for preparing certain alkyl hydroxyalkyl cellulose ethers having such a property is described in the copending application of Albert B. Savage, U. S. Serial No. 581,384, filed April 30, 1956. In that process cellulose is treated with an alkali metal hydroxide at a relatively low temperature to produce an alkali cellulose having a molar ratio of alkali metal hydroxide to cellulose of from about 1.2 to 2.8 moles hydroxide to 1 of cellulose. The alkali cellulose is then etherified by a combination of agents consisting of alkyl chlorides having from 1 to 2 carbon atoms and alkylene oxides having from 2 to 4 carbon atoms. The resultant mixed ethers have gel points of at least 90° C. and in many cases do not gel even in boiling water. The ethers are readily soluble in cold water without the necessity of first wetting with hot water, and the ethers exhibit less insoluble solids than do the prior known ethers of similar structure. When cellulose ethers having substantially lower gel points than 90° C. in aqueous solution are used in the process of this invention, the cellulose ether gels under the process conditions giving non-uniform granulation of the dibenzoyl resorcinol and also causing plugging of filters and other processing equipment, causing significant losses of material. A cellulose ether which gels below 90° C. can be trapped within the dibenzoyl resorcinol granules and cause difficulties in subsequent fabrication operations, such as extrusion, carried out on plastic mixes containing the dibenzoyl resorcinol. The cellulose ether, to be useful here, must be a mixed ether having no polar substitution such as is found in carboxymethyl cellulose and carboxymethyl methyl cellulose, as ethers having such polar substitution exhibit no granulating action in this process. Ethers such as hydroxyethyl cellulose likewise exhibit no granulating action.

The alkyl hydroxyalkyl cellulose ethers may be of any viscosity grade. The viscosity grades available commercially range from 50 cps. to 4000 cps. and all grades within these limits have been found to be operable. The viscosity of a cellulose ether is that of a 2 percent solution in water measured at 20° C. The higher viscosity grades require less material to arrive at a given viscosity than the lower viscosity grades, but the lower viscosity grades generally are more easily dissolvable than the higher viscosity grades. Therefore the particular viscosity grade used will depend upon the manufacturer's desires.

The water-soluble cellulose ether should be employed in aqueous solution in an amount of from 0.05 to 0.6 percent by weight of the dibenzoyl resorcinol, and preferably of from 0.15 to 0.35 percent. When no cellulose ether is used the dibenzoyl resorcinol is not granulated. When substantially more than 0.6 percent cellulose ether is used no proportional increase in granulation is observed, and the product requires prolonged washing to remove the ether. As previously mentioned, excessive residual cellulose ether in the product can cause fabricating difficulties and articles of poor quality.

For practical reasons the ratio of water to dibenzoyl resorcinol should be from about 4 to 1 to 10 to 1. Thus the amount of cellulose ether used will be from about 0.005 to about 0.15 percent of the weight of the water.

The procedural steps of the process consist of dispersing the dibenzoyl resorcinol while molten into an agitated heated aqueous solution of the cellulose ether to form an aqueous suspension of the dibenzoyl resorcinol after which the suspension is allowed to age with agitation while the medium is maintained at the most effective crystallizing temperature until the crystallization of the dibenzoyl resorcinol is complete. Following crystallization the suspension is decanted, water washed, and decanted again after which the concentrated suspension is centrifuged until the dibenzoyl resorcinol is sufficiently dry to be free-flowing and capable of packaging.

It has been found that the temperature of the aqueous cellulose ether solution should be from 40 to 80° C. and preferably from 50 to 70° C. That temperature allows rapid crystallization of the dibenzoyl resorcinol without danger of the cellulose ether gelling. Although slightly lower temperatures than 40° C. may be used, the time required for complete crystallization is proportionately lengthened with such temperatures. When higher temperatures than 80° C. are used the danger of the cellulose ether gelling is increased and the crystallization time is lengthened.

The dibenzoyl resorcinol must be in a form capable of dispersion into relatively uniform particles. It is preferred to disperse the dibenzoyl resorcinol from the molten state because this adds no contaminants to the suspension. An alternative procedure is to disperse the dibenzoyl resorcinol from a solution in a water-immiscible solvent. However, that introduces the solvent as a contaminant requiring removal at some subsequent step and increasing the process cost.

The particle size of the dibenzoyl resorcinol granules formed in the process is principally dependent upon the initial rate of agitation or of shear employed. When very high rates of agitation are employed during the dispersion the dispersed particles of dibenzoyl resorcinol will be correspondingly smaller than when relatively slower rates are employed. Simple preliminary experiments will allow an investigator to determine the rate of agitation required in his particular vessel to achieve his desired particle size.

The time in which crystallization will be complete will vary somewhat with the particle size of the granules, and the temperature of the dispersion. In most cases the crystallization will be complete in from 2 to 4 hours when the aqueous suspension is at a temperature of about 55 to 60° C. During the aging or crystallizing period the suspension is agitated to prevent settling and to prevent coalescence or agglomeration of the particles. The particles after crystallization is complete are hard and non-tacky and when brought into contact with one another will not cohere.

The granular dibenzoyl resorcinol is most conveniently isolated by decanting and centrifuging the dispersion. However, to remove substantially all of the cellulose ether, the granules are water washed with relatively cold water following the first decantation. The particles are then centrifuged to give a free flowing, easily packaged product. It has been found that the dibenzoyl resorcinol may contain up to about 10 percent residual water and still be free-flowing and capable of handling in conventional processing and packaging equipment.

By way of example, molten dibenzoyl resorcinol was dispersed into agitated aqueous solutions of various cellulose ethers. The aqueous solutions of ethers were held at 55° C. and the temperature not allowed to rise over 60° C. The aqueous dispersions of dibenzoyl resorcinol were kept at 55–60° C. for 2.5 hours at which time crystallization was complete. The dispersions were decanted, water washed, and decanted again, after which they were centrifuged in a basket centrifuge until the granular dibenzoyl resorcinol contained not more than 10 percent water. The granulation was examined visually and rated as satisfactory when the particle size distribution was fairly uniform and small, rated fair when some large particles appeared, and rated poor when there were several large particles. The listed viscosity of the cellulose ether is the viscosity in centipoises of a 2 percent aqueous solution at 20° C. The results are listed in Table I.

Table I

| Cellulose ether | Viscosity (cps.) | Gel pt. (° C.) | Percent (based on dibenzoyl resorcinol) | Granulation | Percent residue in DBR granules |
| --- | --- | --- | --- | --- | --- |
| None | | | | poor | |
| Hydroxypropyl methyl cellulose | 400 | 60–65 | 0.4 | fair | 0.35. |
| Do | 1,244 | 80 | 0.4 | do | 0.26. |
| Do | 484 | 90 | 0.4 | do | 0.20. |
| Do | 1,505 | >95 | 0.4 | good | 0.05. |
| Do | 61 | >95 | 0.5 | do | 0.03. |
| Hydroxyethyl methyl cellulose | 400 | 75 | 0.4 | fair | 0.35. |
| Do | 860 | >95 | 0.4 | good | none. |
| Hydroxypropyl ethyl cellulose | 123 | >95 | 0.4 | poor | Do. |
| Carboxymethyl cellulose | 500 | none | 0.4 | very poor | Do. |
| Carboxymethyl methyl cellulose | 2,380 | none | 0.4 | poor | 0.11. |
| Hydroxyethyl cellulose | 150 | none | 0.4 | do | (unable to filter.) |

The above results indicate that the ethers as defined in this invention produce a granular dibenzoyl resorcinol which is substantially free of contaminants. When the gel point of the ether drops below 90° C. however, the granulation is reduced and significant amounts of residual ether are found in the granules. Likewise, when the cellulose ethers contain polar substituents the granulation is poor.

Similar results were obtained whether the dibenzoyl resorcinol consisted of a single isomer, a mixture of the 2,4- and 4,6- isomers, or of halo or alkyl substituted dibenzoyl resorcinols.

We claim:

1. A process for granulating a resinous mass of dibenzoyl resorcinol comprising the sequential steps of dispersing the dibenzoyl resorcinol in liquid form in an agitated aqueous solution of a water-soluble methyl hydroxyalkyl ether of cellulose, having a gelation temperature of at least 90° C., at a temperature of from 40 to 80° C. in proportions to provide from 0.05 to 0.6 percent of the cellulose ether based on the weight of the dibenzoyl resorcinol, maintaining the resulting dispersion at a temperature of from 40 to 80° C. until crystallization of the dibenzoyl resorcinol is substantially complete, recovering the resultant granules from the dispersion, washing the granules with water to remove substantially all of the cellulose ether, and reducing the water content of the granules to a value not to exceed 10 percent of their weight.

2. The process claimed in claim 1 wherein said dibenzoyl resorcinol is added in molten form to said agitated aqueous solution of said cellulose ether.

3. The process claimed in claim 1 wherein said dibenzoyl resorcinol consists of a mixture of 2,4- and 4,6- isomers.

4. The process claimed in claim 1 wherein said alkyl hydroxyalkyl cellulose is a methyl hydroxyethyl cellulose.

5. The process claimed in claim 1 wherein said alkyl hydroxyalkyl cellulose is a methyl hydroxypropyl cellulose.

6. The process claimed in claim 1 wherein said aqueous dispersion of dibenzoyl resorcinol is aged for from 2 to 4 hours.

7. The process claimed in claim 1 wherein said agitated aqueous solution of a water-soluble alkyl hydroxy alkyl ether of cellulose is maintained at a temperature of from 50 to 70° C.

8. The process claimed in claim 1 wherein the weight ratio of water to dibenzoyl resorcinol is from 4 to 1 to 10 to 1.

No references cited.